United States Patent
Bösch et al.

(10) Patent No.: US 9,127,653 B2
(45) Date of Patent: Sep. 8, 2015

(54) SOLAR THERMAL INSTALLATION AND METHOD FOR OPERATING A SOLAR THERMAL INSTALLATION

(71) Applicant: MAN Diesel & Turbo SE, Augsburg (DE)

(72) Inventors: Heinz-Hugo Bösch, Buchholz (DE); Michael Witt, Ahrensburg (DE)

(73) Assignee: MAN Diesel & Turbo SE, Augsburg (DE)

( * ) Notice: Subject to any disclaimer, the term of this patent is extended or adjusted under 35 U.S.C. 154(b) by 237 days.

(21) Appl. No.: 13/793,756

(22) Filed: Mar. 11, 2013

(65) Prior Publication Data

US 2013/0234441 A1 Sep. 12, 2013

(30) Foreign Application Priority Data

Mar. 12, 2012 (DE) .......................... 10 2012 203 805

(51) Int. Cl.

| | |
|---|---|
| *F02C 6/00* | (2006.01) |
| *F02G 1/00* | (2006.01) |
| *F03G 6/06* | (2006.01) |
| *F01K 23/10* | (2006.01) |
| *F24J 2/30* | (2006.01) |
| *F22B 1/00* | (2006.01) |

(52) U.S. Cl.
CPC .............. *F03G 6/067* (2013.01); *F01K 23/101* (2013.01); *F22B 1/006* (2013.01); *F24J 2/30* (2013.01); *Y02E 10/46* (2013.01); *Y02E 20/16* (2013.01)

(58) Field of Classification Search
CPC .......... F03G 6/067; F01K 23/101; F24J 2/30; F22B 1/006; Y02E 20/16; Y02E 10/46
USPC ................ 60/39.182, 39.19, 772, 793, 641.8, 60/641.15, 676; 126/611, 714; 290/54
See application file for complete search history.

(56) References Cited

U.S. PATENT DOCUMENTS

| | | | | |
|---|---|---|---|---|
| 5,444,972 | A | * | 8/1995 | Moore ...................... 60/39.182 |
| 5,727,379 | A | * | 3/1998 | Cohn ......................... 60/39.182 |
| 6,000,211 | A | * | 12/1999 | Bellac et al. .................... 60/775 |
| 6,233,914 | B1 | * | 5/2001 | Fisher .............................. 60/780 |
| 6,321,539 | B1 | | 11/2001 | Bronicki et al. |
| 8,286,429 | B2 | * | 10/2012 | Heide et al. .................. 60/641.8 |
| 2011/0185742 | A1 | | 8/2011 | Heide et al. |
| 2012/0102950 | A1 | * | 5/2012 | Turchi ........................ 60/641.15 |

FOREIGN PATENT DOCUMENTS

| | | |
|---|---|---|
| CN | 102182652 | 9/2011 |
| CN | 102216613 | 10/2011 |
| DE | 2948306 | 6/1981 |

(Continued)

*Primary Examiner* — Hoang Nguyen
(74) *Attorney, Agent, or Firm* — Cosen O'Connor

(57) ABSTRACT

A solar thermal installation and method for operating a solar thermal installation includes a solar collector arrangement which defines a solar collector fluid passage so that a first heat quantity can be supplied to a fluid, and which has a first fluid infeed connection and a first fluid output connection. A heat exchanger fluid passage permits a second heat quantity to be supplied to a fluid. A heating fluid receiving device is fluidically connected with a first fluid output connection and fluidically connects a second fluid output connection to the first fluid output connection by bypassing the solar collector fluid passage. A consumer device is connected to the heating fluid receiving device. At least a portion of the first heat quantity and second heat quantity can be supplied to the consumer device. A control device controls an operation of the gas turbine depending on the first heat quantity.

13 Claims, 2 Drawing Sheets

(56) References Cited

FOREIGN PATENT DOCUMENTS

| DE | 41 26 037 A1 | 2/1993 |
| DE | 101 44 841 C1 | 10/2002 |
| DE | 10 2008 051 384 B3 | 2/2010 |
| DE | 10 2010 061 262 | 6/2011 |
| EP | 0 526 816 | 2/1993 |
| EP | 0 784 157 | 7/1997 |

* cited by examiner

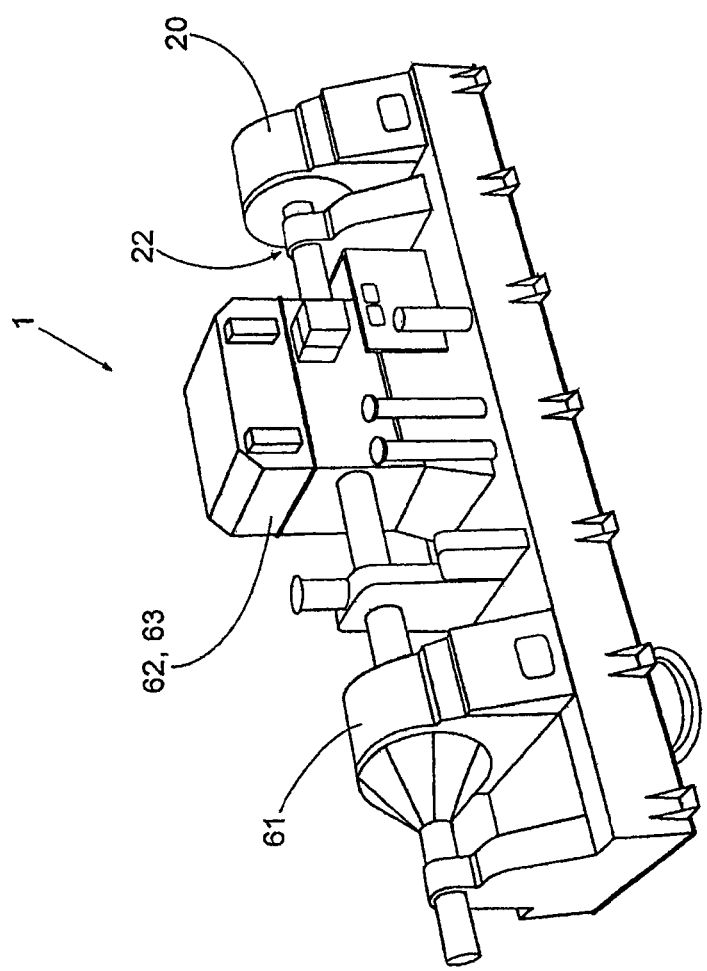

SOLAR THERMAL INSTALLATION AND METHOD FOR OPERATING A SOLAR THERMAL INSTALLATION

BACKGROUND OF THE INVENTION

1. Field of the Invention

The present invention is directed to a solar thermal installation and to a method for operating a solar thermal installation.

2. Description of the Related Art

German Published Patent Application No. 10 2010 061 262 discloses a solar thermal installation having: a solar collector arrangement with a plurality of solar collectors. The solar collector arrangement defines a solar collector fluid passage through which a fluid is guided such that a first heat quantity can be supplied to the fluid by incident solar radiation impinging on the solar collectors, and the solar collector fluid passage has a first fluid infeed connection for feeding fluid which is to be heated into the solar collector fluid passage and a first fluid output connection for outputting heated fluid from the solar collector fluid passage. A gas turbine with an exhaust gas output is also provided in the solar thermal Installation. The installation further includes an exhaust gas heat exchanger with an exhaust gas passage which is connected to the exhaust gas output of the gas turbine for guiding hot exhaust gas of the gas turbine through the exhaust gas passage, and a heat exchanger fluid passage through which a fluid is guided such that a second heat quantity can be supplied to the fluid by the exhaust gas flowing through the exhaust gas passage. The heat exchanger fluid passage has a second fluid infeed connection for feeding fluid to be heated into the heat exchanger fluid passage and a second fluid output connection for outputting heated fluid from the heat exchanger fluid passage. The first fluid output connection is fluidically connected directly with the second fluid infeed connection such that the solar collector fluid passage and the heat exchanger fluid passage are fluidically connected with one another in series. The installation includes a heating fluid receiving device which is fluidically connected with the second fluid output connection, a consumer device with a fluid input which is connected to the heating fluid receiving device such that at least a portion of the first heat quantity and second heat quantity can be supplied to the consumer device via a fluid, and a control device which is connected to the gas turbine and which is adapted to control an operation of the gas turbine depending on a magnitude of the first heat quantity.

German Published Patent Application No. 10 2010 061 262 further discloses a method for operating a solar thermal installation. This method involves supplying by means of a solar collector arrangement a first heat quantity to a fluid flowing through a solar collector fluid passage of the solar collector arrangement; operating a gas turbine depending on a magnitude of the first heat quantity, and supplying by means of an exhaust gas heat exchanger connected to an exhaust gas output of the gas turbine a second heat quantity to a fluid flowing through a heat exchanger fluid passage of the exhaust gas heat exchanger; transferring at least a portion of the first heat quantity to the fluid flowing through the heat exchanger fluid passage of the exhaust gas heat exchanger, and transferring at least a portion of a sum of the first heat quantity and second heat quantity to the heating fluid receiving device; and supplying at least a portion of the sum of the first heat quantity and second heat quantity to a consumer device by means of a fluid.

SUMMARY OF THE INVENTION

It is an object of the present invention to provide a solar thermal installation and a method for operating a solar thermal installation so that a higher energy efficiency can be achieved.

According to a first aspect of the invention, a solar thermal installation has: a solar collector arrangement with a plurality of solar collectors, wherein the solar collector arrangement defines a solar collector fluid passage through which a fluid is guided such that a first heat quantity can be supplied to the fluid by incident solar radiation impinging on the solar collectors, and wherein the solar collector fluid passage has a first fluid infeed connection for feeding fluid which is to be heated into the solar collector fluid passage and a first fluid output connection for outputting heated fluid from the solar collector fluid passage; a gas turbine with an exhaust gas output; an exhaust gas heat exchanger with an exhaust gas passage which is connected to the exhaust gas output of the gas turbine for conveying hot exhaust gas of the gas turbine through the exhaust gas passage, and a heat exchanger fluid passage through which a fluid is guided such that a second heat quantity can be supplied to the fluid by the exhaust gas flowing through the exhaust gas passage, wherein the heat exchanger fluid passage has a second fluid infeed connection for feeding fluid to be heated into the heat exchanger fluid passage and a second fluid output connection for outputting heated fluid from the heat exchanger fluid passage; a heating fluid receiving device which is fluidically connected with the first fluid output connection and which fluidically connects the second fluid output connection to the first fluid output connection by bypassing the solar collector fluid passage; a consumer device with a fluid input which is connected to the heating fluid receiving device such that at least a portion of the first heat quantity and second heat quantity can be supplied to the consumer device via a fluid; and a control device which is connected to the gas turbine and which is adapted to control an operation of the gas turbine depending on a magnitude of the first heat quantity.

The control device can preferably be constructed as an electric or electronic control device and can contain control algorithms in the form of software, firmware and/or hardware.

The solar collector fluid passage and the heat exchanger fluid passage are connected parallel to one another in that the heating fluid receiving device connected to the fluid input of the consumer device is fluidically connected preferably directly to the first fluid output connection and fluidically connects the second fluid output connection preferably directly to the first fluid output connection by bypassing the solar collector fluid passage. Accordingly, when there is sufficient solar energy available so that operation of the gas turbine can be avoided, the fluid heated in the solar collector fluid passage need not be guided through the heat exchanger fluid passage so that heat losses are prevented and, therefore, the energy efficiency of the solar energy is increased.

According to an embodiment of the solar thermal installation according to the present invention, the control device is adapted to put the gas turbine into operation only when the first heat quantity falls below a predetermined limit value.

The heat quantity can fall below the limit value according to the invention when the solar energy that can be converted into heat energy by the solar collector arrangement is reduced at sunset or on overcast days. In this way, the operation of the gas turbine is limited to times when no solar energy or insufficient solar energy is available for reaching the limit value so that the energy efficiency and economy of the solar thermal installation are further increased.

According to a further embodiment of the solar thermal installation according to the present invention, the control device is adapted to supply a portion of the second heat quantity to the fluid flowing through the solar collector fluid passage when the first heat quantity falls below the predetermined limit value so that this fluid is maintained at a predetermined temperature.

With this configuration of the solar thermal installation according to the present invention, it is possible in an advantageous manner to maintain the fluid in the solar collector fluid passage of the solar collector arrangement at a preheating temperature so that the first heat quantity increases to or exceeds the limit value faster during a restarting of heat production by means of the solar collector arrangement and, therefore, combustion gas used in the gas turbine can be economized.

According to yet another embodiment of the solar thermal installation according to the present invention, the fluid to be guided through the solar collector fluid passage and through the heat exchanger fluid passage is formed by water, wherein the fluid to be supplied to the consumer device via the fluid input thereof is formed by water vapor.

Costs can be saved by avoiding cost-intensive special fluids such as oil and by using water and water vapor as fluid.

According to still another embodiment of the solar thermal installation according to the invention, the first fluid infeed connection and the second fluid infeed connection are fluidically connected with one another, wherein the exhaust gas heat exchanger is formed by a waste heat boiler which is adapted to evaporate fluid flowing through the heat exchanger fluid passage to form water vapor that can be taken off at the second fluid output connection, and wherein the solar collector arrangement is adapted to evaporate fluid flowing through the solar collector fluid passage by direct solar evaporation to form water vapor that can be taken off at the first fluid output connection.

A further improvement in economy, e.g., over solar thermal installations operated by a heat transfer oil as fluid in the solar collector arrangement, can be achieved by direct solar evaporation. Since oil-specific components can be dispensed with, costs are reduced and, at the same time, the process temperature and, therefore, the efficiency can be increased compared to oil technology.

According to a further embodiment of the solar thermal installation according to the present invention, the consumer device has a steam turbine and an electric generator which can be rotatably driven by the steam turbine.

According to yet another embodiment of the solar thermal installation according to the present invention, the gas turbine, steam turbine and electric generator are arranged in the form of a single-shaft installation or in alignment on a common axis, wherein the gas turbine and, e.g., for maintenance purposes, preferably also the steam turbine can be selectively brought into and out of a rotational drive connection with the electric generator by means of a coupling which is controllable by the control device.

Accordingly, the individual electric generator can be rotatably driven by the steam turbine as well as by the gas turbine for generating power so that costs for an additional electric generator can be saved. When the gas turbine is switched off, it can be uncoupled from the electric generator to prevent energy losses. During maintenance on the steam turbine, the steam turbine can likewise be uncoupled from the electric generator to avoid energy losses. As a result of the configuration as single-shaft installation, the arrangement of gas turbine, steam turbine, electric generator and possibly also a gearbox becomes extremely compact and cost-efficient.

According to yet another embodiment of the solar thermal installation according to the present invention, the heating fluid receiving device has a plurality of steam lines such as conduit pipes. Further, the heating fluid receiving device can preferably have a plurality of control valves which are controllable by the control device. Steam lines of the heating fluid receiving device can preferably be fluidically connected to the first fluid output connection and second fluid output connection.

According to yet another embodiment of the solar thermal installation according to the present invention, the solar thermal installation also has a feed fluid receiving device. The feed fluid receiving device preferably has a plurality of water lines such as conduit pipes. Further, the feed fluid receiving device can preferably have a plurality of control valves and pumps which are controllable by the control device. Water lines of the feed fluid receiving device are preferably fluidically connected with a fluid output of the consumer device and with the first fluid infeed connection and second fluid infeed connection. Further, water lines of the feed fluid receiving device can preferably be fluidically connected with the second fluid output connection.

According to a second aspect of the invention, a method for operating a solar thermal installation includes: supplying by means of a solar collector arrangement a first heat quantity to a fluid flowing through a solar collector fluid passage of the solar collector arrangement and transferring at least a portion of the first heat quantity to a heating fluid receiving device; comparing the first heat quantity to a limit value; putting a gas turbine into operation when the first heat quantity is less than the limit value and supplying by means of an exhaust gas heat exchanger connected to an exhaust gas output of the gas turbine a second heat quantity to a fluid flowing through a heat exchanger fluid passage of the exhaust gas heat exchanger, and transferring at least a portion of the second heat quantity to the heating fluid receiving device while bypassing the solar collector fluid passage; and supplying at least a portion of the first heat quantity and second heat quantity to a consumer device by means of a fluid.

By transferring at least a portion of the first heat quantity preferably directly to the heating fluid receiving device and at least a portion of the second heat quantity preferably directly to the heating fluid receiving device while bypassing the solar collector fluid passage, the first heat quantity and second heat quantity can be transferred to the heating fluid receiving device parallel to one another. Accordingly, when there is sufficient solar energy available so that operation of the gas turbine can be avoided, the fluid heated in the solar collector fluid passage need not be conducted through the heat exchanger fluid passage so that heat losses are prevented and, therefore, the solar energy is used more efficiently.

The heat quantity can fall below the limit value according to the present invention when the solar energy that can be converted into heat energy by the solar collector arrangement is reduced at sunset or on overcast days. In this way, the operation of the gas turbine is limited to times when no solar energy or insufficient solar energy is available for reaching the limit value so that the energy efficiency and economy of the solar thermal installation are further increased.

According to a further embodiment of the method according to the present invention, electrical energy is generated by means of a rotational drive which is provided by the consumer device during operation thereof and is fed into a power grid, wherein electrical energy is generated by means of a rotational drive provided by the gas turbine during operation thereof and is fed into the power grid.

In this way, both of the available rotational drives are advantageously used to generate power or electrical energy, which further increases energy efficiency.

According to a further embodiment of the method according to the present invention, a portion of the second heat quantity is supplied to the fluid flowing through the solar collector fluid passage of the solar collector arrangement when the first heat quantity is less than the limit value so that this fluid is maintained at a predetermined temperature.

With this configuration of the method according to the present invention, it is possible in an advantageous manner to maintain the fluid in the solar collector fluid passage of the solar collector arrangement at a preheating temperature so that the first heat quantity increases to or exceeds the limit value faster during a restart of heat production by means of the solar collector arrangement and, therefore, fuel gas used in the gas turbine can be economized.

According to yet another embodiment of the method according to the present invention, the first heat quantity is supplied to water as fluid so that water vapor is generated therefrom via direct solar evaporation and is conducted into a steam line of the heating fluid receiving device, the second heat quantity being supplied to water as fluid so that water vapor is generated therefrom and conducted into the steam line of the heating fluid receiving device.

Costs can be saved by avoiding cost-intensive special fluids such as oil and by using water and water vapor as fluid. A further improvement in economy over, e.g., solar thermal installations operated by a heat transfer oil as fluid in the solar collector arrangement can be achieved by direct solar evaporation. Since oil-specific components can be dispensed with, costs are reduced and, at the same time, the process temperature and, therefore, the efficiency can be increased compared to oil technology.

Finally, according to an embodiment of the present invention, a solar thermal installation is provided which is configured as a CSP (Concentrated Solar Power) plant with direct solar evaporation. Further, according to embodiment forms of the invention, a method is provided for operating a solar thermal installation of this kind.

The present invention resides in the combinatorics of a solar array (solar collector arrangement) and a steam turbine with the arrangement and incorporation of an industrial gas turbine in the general process.

According to the present invention, the gas turbine can be started at sunset and, therefore, when the first heat quantity falls below the limit value and production of steam from the solar array declines accordingly. The steam produced in the downstream waste heat boiler can be supplied to the steam turbine; in this hybrid mode, the steam turbine drives nighttime operation preferably at partial load according to the available amount of steam from the gas turbine process. On heavily overcast days, as a result of which the first heat quantity falls below the limit value and steam production decreases, it is also possible to produce steam by means of the gas turbine and to operate the steam turbine continuously at partial load.

The additionally produced electrical output of the gas turbine can be fed into the power grid in addition to the electrical output produced by the steam turbine. Further, steam can be taken off from the waste heat boiler to keep the solar array at a preheating temperature. In this way, the starting process for the solar array is facilitated and realized at a quicker pace on the following day or when cloudiness subsides. The annual full-load operating hours in solar operation of the solar thermal installation, preferably combined with a power plant, can be increased appreciably by the elimination of heat-up times. Especially in decentralized plants, where economical use of a molten salt storage is not possible because of cost considerations, an industrial gas turbine can be used to fill those time gaps when the solar array cannot produce steam.

The present invention further comprises the arrangement of the two turbomachines, namely, the gas turbine and steam turbine, including secondary systems such as generator, oil system and cooling systems. Accordingly, the turbo train comprising gas turbine, gearbox, generator, gearbox, steam turbine can be configured as single-shaft installation, in part with couplings for hybrid operation that can be connected on demand.

According to the present invention, cyclical daily steam turbine operation resulting from dependency on and/or limitation of sunshine hours can be avoided. This benefits the transient startup behavior of the steam turbine, which in turn enables the user to realize greater efficiency. By optimally incorporating the gas turbine in the CSP steam turbine process, steam production can be maintained during nighttime hours for continuous steam turbine operation by means of the downstream waste heat boiler. Further, the CSP installation, including the conduit system thereof, can be kept warm so that the startup process can take place optimally and quickly at sunrise or when clouds disperse. The overall efficiency and, therefore, economy is considerably improved.

The present invention also expressly extends to embodiment forms which are not given by combinations of features from explicit references to the claims so that the disclosed features of the invention can be combined with one another in any way insofar as technically meaningful.

An embodiment of the solar thermal installation according to the present invention which is not described in greater detail has a gas engine and/or diesel engine in addition to or instead of the gas turbine. While in some configurations, integration of the gas engine or diesel engine requires additional modifications within the overall arrangement, for example, additional or expanded exhaust gas outputs, fuel feeds, connections to electric generators and control devices, these are not relevant to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 2 shows a perspective view of the arrangement of gas turbine, steam turbine and electric generator of a solar thermal installation according to an embodiment of the present invention in the form of a single-shaft installation.

DETAILED DESCRIPTION OF THE PRESENTLY PREFERRED EMBODIMENTS

Figure 1:
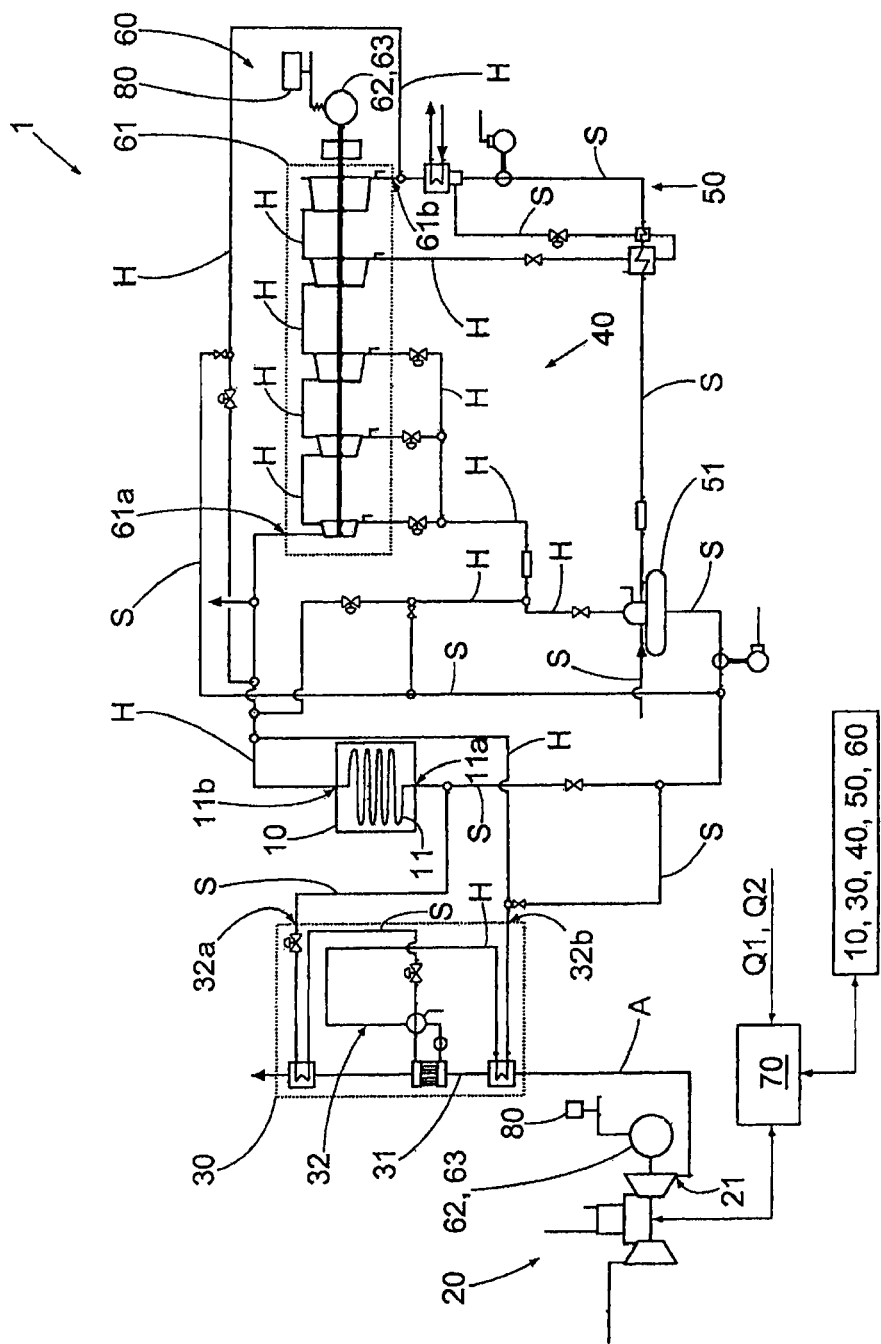
FIG. 1 shows a schematic diagram of a solar thermal installation according to an embodiment of the present invention.

Embodiments of a solar thermal installation 1 according to the invention will be described in the following with reference to FIGS. 1 and 2.

The solar thermal installation 1 is configured as a CSP (Concentrated Solar Power) plant with direct solar evaporation combined in an electric power plant. As is shown in FIG. 1, the solar thermal installation 1 has a solar collector arrangement 10 with a plurality of solar collectors (not shown in detail), a gas turbine 20, an exhaust gas heat exchanger 30, a heating fluid receiving device 40, a feed fluid receiving device 50, a consumer device 60, and a control device 70.

The control device can preferably be constructed as an electric or electronic control device and can contain control algorithms in the form of software, firmware and/or hardware. The control device 70 is connected to the solar collector arrangement 10, the gas turbine 20, the exhaust gas heat exchanger 30, the heating fluid receiving device 40, the feed fluid receiving device 50, and the consumer device 60 for the control or adjustment thereof.

The heating fluid receiving device 40 has a plurality of steam lines H such as conduit pipes and a plurality of control valves (not designated) which are controllable by the control device 70.

The feed fluid receiving device 50 has a plurality of water lines S such as conduit pipes and a plurality of control valves (not designated), pumps (not designated) and further components (not designated) such as heat exchangers, water separators, etc. which are controllable by the control device 70.

According to the invention, the steam lines H guide water vapor and the water lines S guide water or feedwater and/or possibly water vapor at a reduced temperature level compared to the water vapor in the steam lines H.

The solar collector arrangement 10 defines a solar collector fluid passage 11 through which a fluid is guided such that a first heat quantity Q1 can be supplied to the fluid by incident solar radiation impinging on the solar collectors. The solar collector fluid passage 11 has a first fluid infeed connection 11a for feeding fluid in the form of feedwater which is to be heated into the solar collector fluid passage 11 and a first fluid output connection 11b for outputting heated fluid in the form of water vapor from the solar collector fluid passage 11.

Accordingly, the solar collector arrangement 10 is adapted to generate water vapor by direct solar evaporation of water by supplying the first heat quantity Q1. In other words, the solar collector arrangement 10 is adapted to evaporate fluid in the form of water flowing through the solar collector fluid passage 11 by direct solar evaporation to form water vapor which can be taken off at the first fluid output connection 11b. In so doing, the solar collector arrangement 10 achieves live steam parameters of 40 bar and 400° C.

The gas turbine 20 is operated with natural gas as fuel gas and has an exhaust gas output 21 which is connected to an exhaust gas passage 31 of the exhaust gas heat exchanger 30 by an exhaust gas line A for guiding hot exhaust gas of the gas turbine 20 through the exhaust gas passage 31.

The exhaust gas heat exchanger 30 is formed by a waste heat boiler and has a heat exchanger fluid passage 32 through which a fluid is guided such that a second heat quantity Q2 can be supplied to the fluid by the exhaust gas flowing through the exhaust gas passage 31. The heat exchanger fluid passage 32 has a second fluid infeed connection 32a for feeding fluid in the form of water to be heated into the heat exchanger fluid passage 32 and a second fluid output connection 32b for outputting heated fluid in the form of water vapor from the heat exchanger fluid passage 32.

The exhaust gas heat exchanger 30 is accordingly adapted to evaporate fluid in the form of water flowing through the heat exchanger fluid passage 32 to form water vapor that can be taken off at the second fluid output connection 32b by supplying the second heat quantity Q2.

As can be seen from FIG. 1, the heating fluid receiving device 40 is fluidically connected with the first fluid output connection 11b of the solar collector fluid passage 11 by one or more steam lines H. Further, the heating fluid receiving device 40 fluidically connects the second fluid output connection 32b of the heat exchanger fluid passage 32 via one or more steam lines H directly to the first fluid output connection 11b while bypassing the solar collector fluid passage 11.

The consumer device 60 has a steam turbine 61 and an electric generator 62 which can be rotatably driven by the steam turbine 61. The steam turbine 61 has a fluid input 61a and a fluid output 61b.

The fluid input 61a is connected to the heating fluid receiving device 40 such that at least a portion of the first heat quantity Q1 and second heat quantity Q2 can be supplied to the consumer device 60 via a fluid. In the illustrated embodiment form, the fluid input 61a is fluidically connected via one or more steam lines H of the heating fluid receiving device 40 directly with the first fluid output connection 11b of the solar collector fluid passage 11 and directly with the second fluid output connection 32b of the heat exchanger fluid passage 32.

The fluid output 61b is fluidically connected to the first fluid infeed connection 11a of the solar collector fluid passage 11 and to the second fluid infeed connection 32a of the heat exchanger fluid passage 32 via one or more water lines S and further components (such as a feedwater collection vessel 51) of the feed fluid receiving device 50. Further, as can be seen from FIG. 1, the first fluid infeed connection 11a and second fluid infeed connection 32a are fluidically connected to one another via one or more water lines S of the feed fluid receiving device 50.

The control device 70 is adapted, according to the invention, to control an operation of the gas turbine 20 depending on a magnitude of the first heat quantity Q1. According to an embodiment form of the solar thermal installation 1 according to the invention, the control device 70 is adapted to put the gas turbine 20 into operation only when the first heat quantity Q1 falls below a predetermined limit value.

The heat quantity can fall below this limit value according to the invention when the solar energy that can be converted into heat energy by the solar collector arrangement 10 is reduced at sunset or on overcast days.

According to a further embodiment of the solar thermal installation 1 according to the present invention, the control device 70 is adapted to supply a portion of the second heat quantity Q2 to the fluid flowing through the solar collector fluid passage 11 when the first heat quantity Q1 falls below the predetermined limit value such that this fluid is maintained at a predetermined temperature, namely, a preheating temperature.

As was mentioned above, the consumer device 60 has the electric generator 62 which feeds electrical energy into a power grid 80 when driven in rotation. As can be seen from FIG. 1, the gas turbine 20 can also be connected to an electric generator 63 to rotatably drive the electric generator 63 so that the electric generator 63 feeds electrical energy into the power grid 80 when driven in rotation.

According to an embodiment of the solar thermal installation 1 shown in FIG. 2, the gas turbine 20, steam turbine 61 and an individual electric generator 62 or 63 are arranged in the form of a single-shaft installation or in alignment on a common axis. The gas turbine 20 can be selectively brought into and out of a rotational driving connection with the electric generator 62, 63 by means of a coupling 22 which is controllable by the control device 70. According to an embodiment form of the solar thermal installation 1 according to the invention which is not shown in FIG. 2, the steam turbine 61 can also be selectively brought into and out of a rotational driving connection with the electric generator 62, 63 by means of a coupling which is controllable by the control device 70, e.g., for maintenance purposes.

Embodiments of a method according to the present invention for operating the solar thermal installation 1 according to the invention will now be described referring to FIGS. 1 and 2. The method includes at least the following steps: supplying by means of the solar collector arrangement 10 the first heat quantity Q1 to the fluid flowing through the solar collector fluid passage 11 of the solar collector arrangement 10 and transferring at least a portion of the first heat quantity Q1 to the heating fluid receiving device 40; comparing the first heat quantity Q1 to the limit value in the control device 70; putting the gas turbine 20 into operation when the first heat quantity Q1 is less than the limit value, and supplying by means of the exhaust gas heat exchanger 30 connected to the exhaust gas output 21 of the gas turbine 20 the second heat quantity Q2 to the fluid flowing through the heat exchanger fluid passage 32 of the exhaust gas heat exchanger 30, and transferring at least a portion of the second heat quantity Q2 to the heating fluid receiving device 40 while bypassing the solar collector fluid passage 11; and supplying at least a portion of the first heat quantity Q1 and second heat quantity Q2 to the consumer device 60 by means of a fluid.

According to an embodiment of the method according to the present invention, electrical energy is generated by means of the rotational driving which is provided by the steam turbine 61 of the consumer device 60 during operation thereof and is fed into a power grid 80; further, electrical energy is generated by means of a rotational driving provided by the gas turbine 20 during operation thereof and is fed into the power grid 80.

According to a further embodiment of the method according to the present invention, a portion of the second heat quantity Q2 is supplied to the fluid flowing through the solar collector fluid passage 11 of the solar collector arrangement 10 when the first heat quantity Q1 is less than the limit value so that this fluid is maintained at a predetermined temperature (preheating temperature).

According to yet another embodiment of the method according to the present invention, the first heat quantity Q1 is supplied to water as fluid so that water vapor is generated therefrom via direct water evaporation and is conducted into one or more steam lines H of the heating fluid receiving device 40, the second heat quantity Q2 being supplied to water as fluid so that water vapor is generated therefrom and conducted into the one or more steam lines H of the heating fluid receiving device 40.

According to the present invention, the gas turbine 20 can be started at sunset and, therefore, when the first heat quantity Q1 falls below the limit value and production of steam from the solar collector 10 declines accordingly. The water vapor produced in the downstream exhaust gas heat exchanger 30 can be supplied to the steam turbine 61; in this hybrid mode, the steam turbine 61 drives nighttime operation preferably at partial load according to the available amount of steam from the gas turbine process. On heavily overcast days, as a result of which the first heat quantity Q1 falls below the limit value and steam production decreases, it is also possible to produce water vapor by means of the gas turbine 20 and to operate the steam turbine 61 continuously at partial load.

The additionally produced electrical output of the gas turbine 20 can be fed into the power grid 80 in addition to the electrical output produced by the steam turbine 61. Further, water vapor can be taken off from the exhaust gas heat exchanger 30 to keep the solar collector arrangement 10 at the preheating temperature. In this way, the starting process for the solar collector arrangement 10 is facilitated and realized at a quicker pace on the following day or when cloudiness subsides.

In the embodiment described above, a nominal output of almost 9 MW of the electric power plant can be maintained electrically for ISO conditions, e.g., therefore, at night with, e.g., 8.43 MW. The additional natural gas requirement for the gas turbine 20 can amount to 0.425 kg/s, for example. In full solar mode without the gas turbine 20, a gross efficiency of, e.g., 29.4% can be achieved, and a gross efficiency of, e.g., 39.7% can be achieved in hybrid mode with gas turbine 20 and steam turbine 61

It should be noted that the claimed device is likewise suited for combination with a large diesel engine. For example, the energy of the exhaust gases of the large diesel engine can be used to operate subcomponents, e.g., the gas turbine or steam turbine, of the claimed device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A solar thermal installation, comprising:
a solar collector arrangement including a plurality of solar collectors and defining a solar collector fluid passage through which a fluid is guided such that a first heat quantity can be supplied to the fluid by incident solar radiation impinging on the solar collectors, wherein the solar collector fluid passage includes:
a first fluid infeed connection for feeding the fluid which is to be heated into the solar collector fluid passage, and
a first fluid output connection for outputting the heated fluid from the solar collector fluid passage;
a gas turbine including an exhaust gas output;
an exhaust gas heat exchanger including:
an exhaust gas passage connected to the exhaust gas output of the gas turbine and for conveying hot exhaust gas of the gas turbine through the exhaust gas passage, and
a heat exchanger fluid passage through which the fluid is guided such that a second heat quantity can be supplied to the fluid by the exhaust gas flowing through the exhaust gas passage, the heat exchanger fluid passage including a second fluid infeed connection for feeding the fluid to be heated into the heat exchanger fluid passage, and a second fluid output connection for outputting the heated fluid from the heat exchanger fluid passage;
a heating fluid receiving device fluidically connected with the first fluid output connection and for fluidically connecting the second fluid output connection to the first fluid output connection by bypassing the solar collector fluid passage such that at least a portion of the first heat quantity may be transferred directly to the heating fluid receiving device and at least a portion of the second heat quantity can be transferred directly to the heating fluid receiving device by the bypassing of the solar collector fluid passage so that the first heat quantity and the second heat quantity are transferable to the heating fluid receiving device parallel to one another;

a consumer device including a fluid input connected to the heating fluid receiving device such that at least a portion of the first heat quantity and at least a portion of the second heat quantity can be supplied to the consumer device via the fluid; and a control device connected to the gas turbine and adapted to control an operation of the gas turbine depending on a magnitude of the first heat quantity.

2. The solar thermal installation according to claim 1, wherein the control device is adapted to put the gas turbine into operation only when the first heat quantity falls below a predetermined limit value.

3. The solar thermal installation according to claim 2, wherein the control device is adapted to supply a portion of the second heat quantity to the fluid flowing through the solar collector fluid passage when the first heat quantity falls below the predetermined limit value so that the fluid is maintained at a predetermined temperature.

4. The solar thermal installation according to claim 1, wherein:
the fluid to be guided through the solar collector fluid passage and through the heat exchanger fluid passage includes water, and
the fluid to be supplied to the consumer device via the fluid input thereof includes water vapor.

5. The solar thermal installation according to claim 4, wherein:
the first fluid infeed connection and the second fluid infeed connection are fluidically connected with one another,
the exhaust gas heat exchanger includes a waste heat boiler adapted to evaporate the fluid flowing through the heat exchanger fluid passage to form water vapor that can be taken off at the second fluid output connection, and
the solar collector arrangement is adapted to evaporate the fluid flowing through the solar collector fluid passage by direct solar evaporation to form water vapor that can be taken off at the first fluid output connection.

6. The solar thermal installation according to claim 1, wherein the consumer device includes a steam turbine and an electric generator which can be rotatably driven by the steam turbine.

7. The solar thermal installation according to claim 6, wherein:
the gas turbine, the steam turbine, and the electric generator are arranged as a single-shaft installation, and the gas turbine can be selectively brought into and out of a rotational drive connection with the electric generator by a coupling that is controllable by the control device.

8. The solar thermal installation according to claim 1, further comprising at least one of a gas engine and a diesel engine.

9. A method for operating a solar thermal installation, comprising:
supplying, by a solar collector arrangement, a first heat quantity to a fluid flowing through a solar collector fluid passage of the solar collector arrangement;
transferring at least a portion of the first heat quantity to a heating fluid receiving device;
comparing the first heat quantity to a limit value;
putting a gas turbine into operation when the first heat quantity is less than the limit value;
supplying, by an exhaust gas heat exchanger connected to an exhaust gas output of the gas turbine, a second heat quantity to the fluid flowing through a heat exchanger fluid passage of the exhaust gas heat exchanger,
transferring at least a portion of the second heat quantity to the heating fluid receiving device while bypassing the solar collector fluid passage such that at least a portion of the first heat quantity may be transferred directly to the heating fluid receiving device and at least a portion of the second heat quantity can be transferred directly to the heating fluid receiving device by the bypassing of the solar collector fluid passage so that the first heat quantity and the second heat quantity are transferable to the heating fluid receiving device parallel to one another; and
supplying at least a portion of the first heat quantity and the second heat quantity to a consumer device by the fluid.

10. The method according to claim 9, further comprising: generating electrical energy by a rotational drive provided by the consumer device during operation thereof; and feeding the electrical energy into a power grid.

11. The method according to claim 9, further comprising: generating electrical energy by a rotational drive provided by the gas turbine during operation thereof; and feeding the electrical energy into a power grid.

12. The method according to claim 9, further comprising: supplying the portion of the second heat quantity to the fluid flowing through the solar collector fluid passage of the solar collector arrangement when the first heat quantity is less than the limit value so that the fluid is maintained at a predetermined temperature.

13. The method according to claim 9, further comprising: operating at least one of a gas engine and a diesel engine one of in addition to and instead of the gas turbine.

\* \* \* \* \*